United States Patent
Wada

(10) Patent No.: US 9,243,978 B2
(45) Date of Patent: Jan. 26, 2016

(54) MISFIRE DETECTION APPARATUS AND MISFIRE DETECTION METHOD FOR AN INTERNAL COMBUSTION ENGINE

(71) Applicant: Mitsubishi Electric Corporation, Chiyoda-ku, Tokyo (JP)

(72) Inventor: Shuichi Wada, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 14/167,682

(22) Filed: Jan. 29, 2014

(65) Prior Publication Data

US 2015/0075508 A1  Mar. 19, 2015

(30) Foreign Application Priority Data

Sep. 18, 2013 (JP) .................. 2013-193188

(51) Int. Cl.
- *G01M 15/11* (2006.01)
- *F02D 41/40* (2006.01)
- *F02D 41/22* (2006.01)

(52) U.S. Cl.
CPC ............. *G01M 15/11* (2013.01); *F02D 41/22* (2013.01); *F02D 41/40* (2013.01); *F02D 2200/1015* (2013.01)

(58) Field of Classification Search
CPC ........ G01M 15/11; F02D 41/22; F02D 41/40; F02D 2200/1015
USPC ......... 123/673, 672, 690, 698, 699, 700, 703, 123/406.45, 406.47; 701/103, 104, 109, 701/111
See application file for complete search history.

(56) References Cited

U.S. PATENT DOCUMENTS

| | | | |
|---|---|---|---|
| 2007/0028596 A1* | 2/2007 | Takaku | F01N 3/22 60/277 |
| 2013/0158841 A1* | 6/2013 | Ito | F02D 41/0085 701/104 |
| 2013/0197784 A1* | 8/2013 | Sakaguchi | F02D 41/22 701/104 |

FOREIGN PATENT DOCUMENTS

JP         5208289 B1   6/2013

* cited by examiner

*Primary Examiner* — Mahmoud Gimie
(74) *Attorney, Agent, or Firm* — Sughrue Mion, PLLC; Richard C. Turner

(57) ABSTRACT

Provided are a misfire detection apparatus and a misfire detection method for an internal combustion engine, which are capable of correctly detecting a misfire state of an engine for a vehicle small in number of cylinders and in rotational inertia without limiting control to $O_2$ feedback control. When an air/fuel ratio of an exhaust gas exhausted from a cylinder that is a misfire determination subject is in a lean state, and when lean control is not being carried out on the internal combustion engine, enrichment processing for the air/fuel ratio is carried out. When the air/fuel ratio remains in the lean state even though the enrichment processing is carried out, it is determined that misfire occurs in the cylinder that is a misfire determination subject.

7 Claims, 5 Drawing Sheets

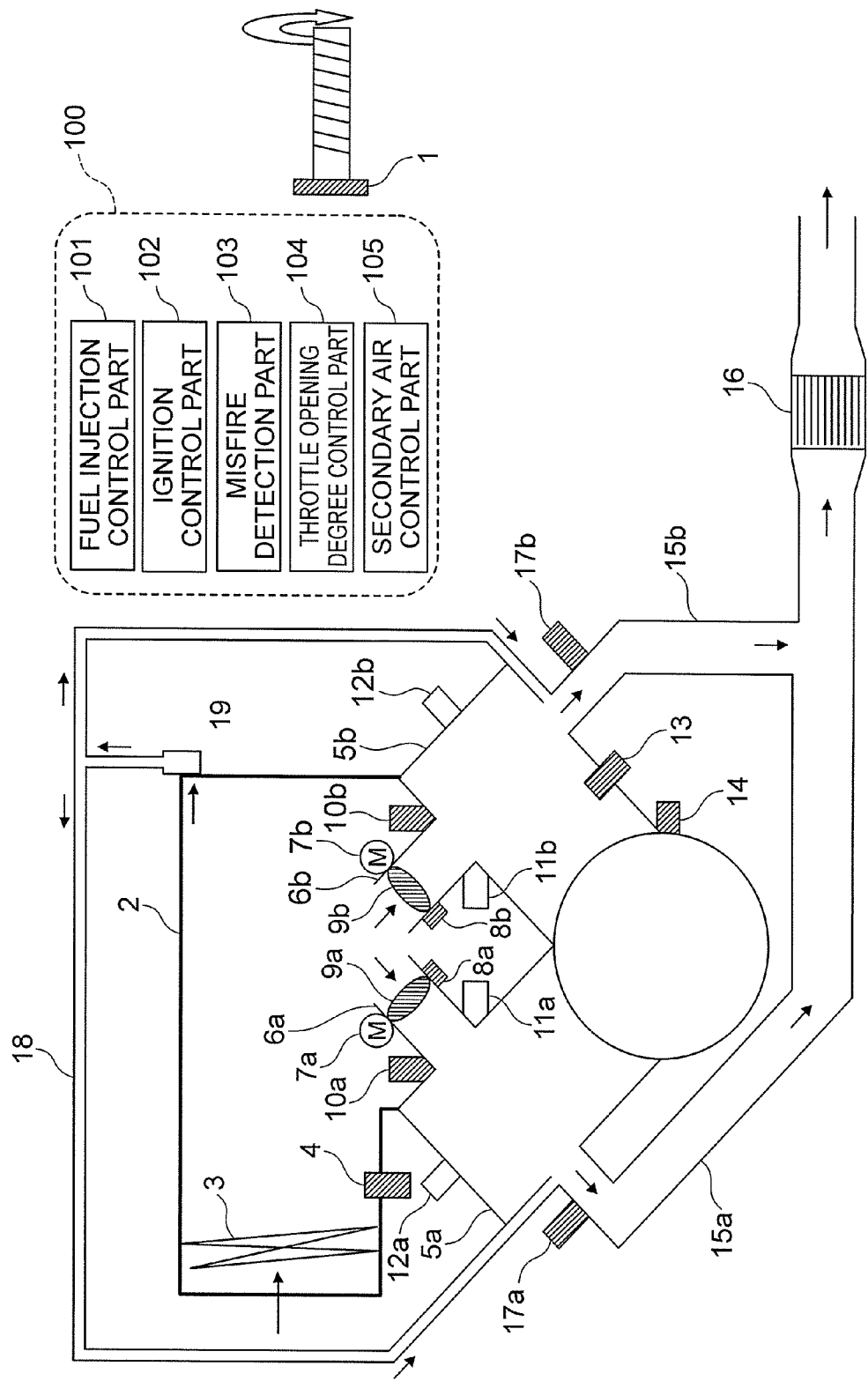

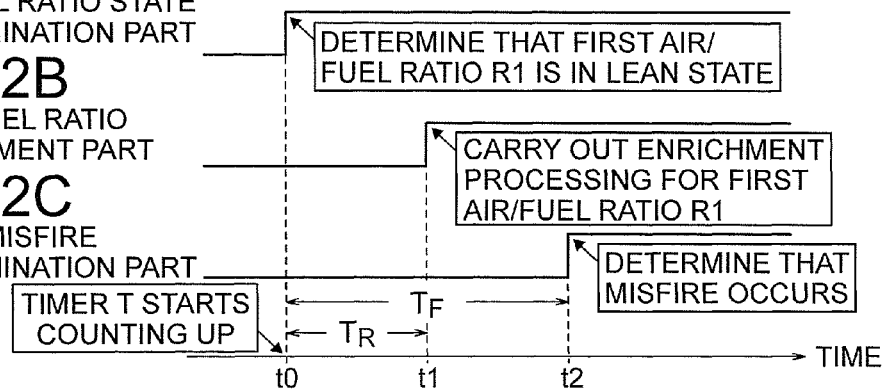
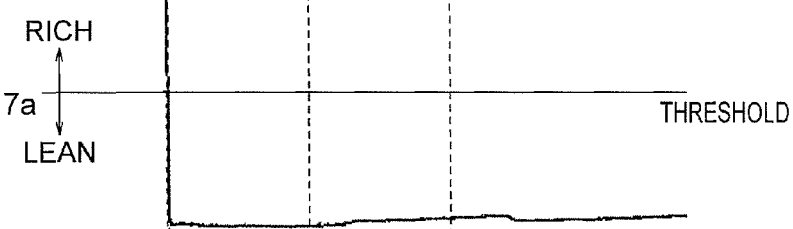

FIG. 3A
AIR/FUEL RATIO STATE
DETERMINATION PART
FIG. 3B
AIR/FUEL RATIO
ADJUSTMENT PART
FIG. 3C
MISFIRE
DETERMINATION PART
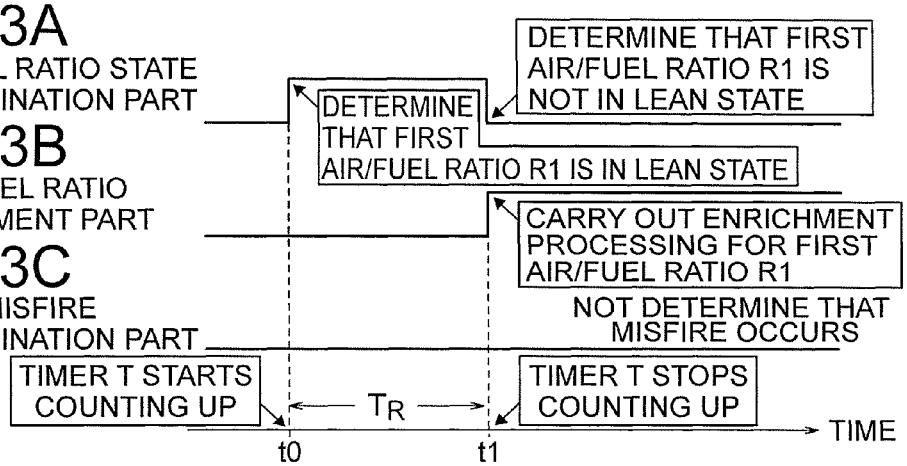
FIG. 3D
FIRST AIR/FUEL
RATIO SENSOR 17a
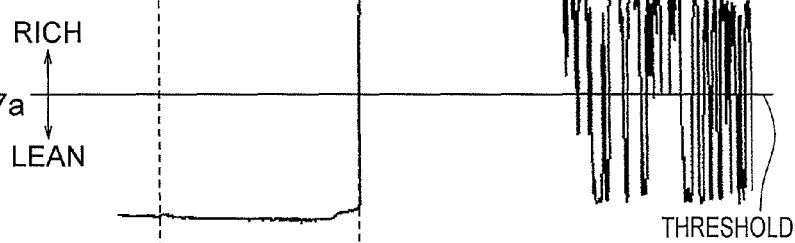
FIG. 3E
SECOND AIR/FUEL
RATIO SENSOR 17b
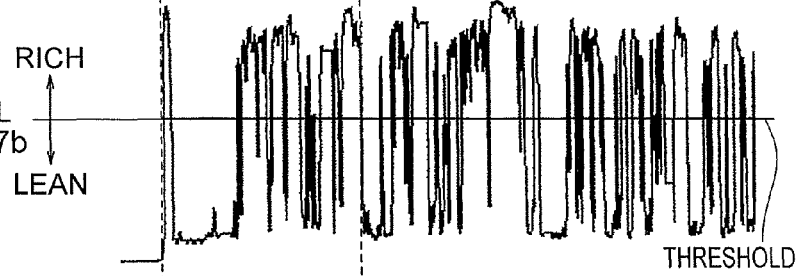

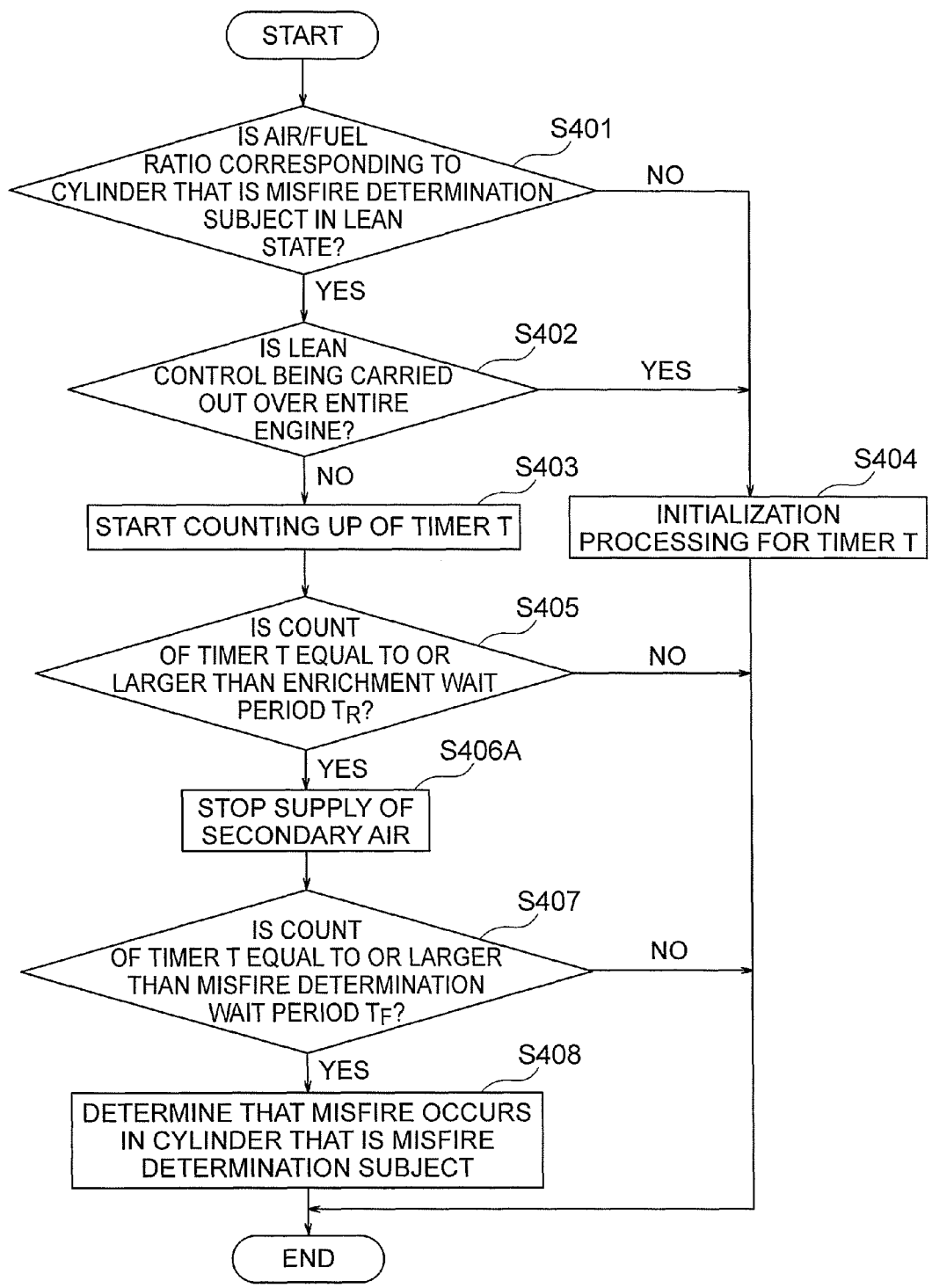

MISFIRE DETECTION APPARATUS AND MISFIRE DETECTION METHOD FOR AN INTERNAL COMBUSTION ENGINE

BACKGROUND OF THE INVENTION

1. Field of the Invention

The present invention relates to a misfire detection apparatus and a misfire detection method for an internal combustion engine, which are applicable to an internal combustion engine including a plurality of cylinders, for determining presence/absence of misfire in each of the plurality of cylinders.

2. Description of the Related Art

In recent years, detection of a misfire state in an internal combustion engine (hereinafter also referred to as engine) has been demanded as environmental measures in order to prevent unburned gas from being exhausted, and to protect a catalyst provided on an exhaust system of the engine on four-wheeled vehicles as well as two-wheeled vehicles.

On this occasion, as a first measure for detecting the misfire state of the engine, there is a measure for monitoring a change in an r.p.m. of an engine (r.p.m. of a crankshaft), and detecting a misfire state of the engine based on the fluctuation in rotation (for example, refer to Japanese Patent Application Laid-open No. Sho 58-19532).

Moreover, as a second measure for detecting the misfire state of the engine, there is a measure for detecting the misfire state of the engine based on a rich/lean cycle of a detection signal from an air/fuel ratio sensor for detecting a mixing ratio of air to fuel of a mixture to be combusted in the engine, namely an air/fuel ratio (for example, refer to Japanese Patent No. 5208289).

However, the related arts have the following problems.

When the related art described in Japanese Patent Application Laid-open No. Sho 58-19532 is applied to a vehicle small in number of cylinders such as a V-twin engine and small in rotational inertia due to a small flywheel (such as a two-wheeled vehicle), fluctuation in rotation is significant, and the misfire state of the engine cannot be correctly detected. In other words, fluctuation in rotation in a normal state without misfire is increased due to influence of a difference in combustion state generated between cylinders, and a determination error in misfire and a loss in detection of the misfire thus occur, resulting in incorrect detection of the misfire state of the engine.

Moreover, in the related art described in Japanese Patent No. 5208289, the air/fuel ratio sensor is not provided for each of the exhaust pipes connected to the plurality of cylinders of the engine, but for a collector of the exhaust pipes. However, the air/fuel ratio sensor may need to be provided at a location spaced apart from the collector depending on a vehicle to which the related art is applied. In this case, the unburned gas exhausted in the misfire state and the burned gas exhausted in the normal state reach a detection area of the air/fuel ratio sensor in a mixed manner, and a difference in rich/lean cycle between the misfire state and the normal state may not be correctly detected. Thus, the misfire state of the engine may not be correctly detected based on the rich/lean cycle of the detection signal from the air/fuel ratio sensor.

Moreover, in the related art described in Japanese Patent No. 5208289, when lengths from the plurality of cylinders of the engine to the collector of the exhaust pipes are different from each other, the burned gas and the unburned gas exhausted from the respective cylinders reach the detection area of the air/fuel ratio sensor at timings different from each other, and the difference in rich/lean cycle between the misfire state and the normal state may not be correctly detected.

Moreover, in the related art described in Japanese Patent No. 5208289, the misfire state is detected only for closed loop control (also referred to as $O_2$ feedback) in the air/fuel ratio control using the air/fuel ratio sensor. Moreover, in general, the fuel is gently increased and decreased in correction without increasing and decreasing the fuel by an amount causing a clear rich or lean state in order to alleviate influence on the engine behavior even for the $O_2$ feedback control. Thus, there often occurs such a case that the value of the rich/lean cycle even after a normal combustion is not an intended value due to influence of fluctuation in the combustion states of the respective cylinders. Therefore, the rich/lean cycle in the misfire state and that in the normal state cannot be distinguished from each other, and these states may not be correctly determined.

SUMMARY OF THE INVENTION

The present invention has been made in view of the above-mentioned problems, and therefore has an object to provide a misfire detection apparatus and a misfire detection method for an internal combustion engine, which are capable of correctly detecting a misfire state of an engine for a vehicle small in number of cylinders and in rotational inertia without limiting control to $O_2$ feedback control.

According to one embodiment of the present invention, there is provided a misfire detection apparatus for an internal combustion engine, which is configured to detect misfire in the internal combustion engine including a plurality of cylinders each connected to an exhaust pipe for exhausting an exhaust gas, and each including, on the exhaust pipe, an air/fuel ratio sensor for detecting an air/fuel ratio of the exhaust gas, the misfire detection apparatus being configured to carry out air/fuel ratio control for controlling the air/fuel ratio of the exhaust gas exhausted from each of the plurality of cylinders, the misfire detection apparatus including: an air/fuel ratio state determination part for determining, based on a detection signal from a first air/fuel ratio sensor corresponding to a first cylinder that is a misfire determination subject among the plurality of cylinders, whether or not a first air/fuel ratio of the exhaust gas exhausted from the first cylinder is in a lean state; an air/fuel ratio control determination part for determining, based on a detection signal from a second air/fuel ratio sensor corresponding to a second cylinder that is a remaining cylinder different from the first cylinder among the plurality of cylinders, whether or not lean control is being carried out as the air/fuel ratio control carried out on the internal combustion engine; an air/fuel ratio adjustment part for carrying out enrichment processing for the first air/fuel ratio at a time (t1) after an enrichment wait period ($T_R$) has elapsed since a time (t0) when the air/fuel ratio state determination part determines that the first air/fuel ratio is in the lean state and the air/fuel ratio control determination part determines that the lean control is not being carried out on the internal combustion engine; and a misfire determination part for determining that misfire occurs in the first cylinder when the air/fuel ratio adjustment part has carried out the enrichment processing at the time (t1), and when the air/fuel ratio state determination part determines that the first air/fuel ratio is still in the lean state at a time (t2) after a misfire determination wait period ($T_F$) longer than the enrichment wait period ($T_R$) has elapsed since the time (t0).

Further, according to one embodiment of the present invention, there is provided a misfire detection method for an internal combustion engine, which involves detecting misfire in the internal combustion engine including a plurality of cylinders each connected to an exhaust pipe for exhausting an exhaust gas, and each including, on the exhaust pipe, an air/fuel ratio sensor for detecting an air/fuel ratio of the exhaust gas, the misfire detection method involving carrying out air/fuel ratio control for controlling the air/fuel ratio of the exhaust gas exhausted from each of the plurality of cylinders, the misfire detection method including: determining, based on a detection signal from a first air/fuel ratio sensor corresponding to a first cylinder that is a misfire determination subject among the plurality of cylinders, whether or not a first air/fuel ratio of the exhaust gas exhausted from the first cylinder is in a lean state; determining, based on a detection signal from a second air/fuel ratio sensor corresponding to a second cylinder that is a remaining cylinder different from the first cylinder among the plurality of cylinders, whether or not lean control is being carried out as the air/fuel ratio control carried out on the internal combustion engine; carrying out enrichment processing for the first air/fuel ratio at a time (t1) after an enrichment wait period ($T_R$) has elapsed since a time (t0) when it is determined that the first air/fuel ratio is in the lean state and that the lean control is not being carried out on the internal combustion engine; and determining that misfire occurs in the first cylinder when the enrichment processing has been carried out at the time (t1), and when it is determined that the first air/fuel ratio is still in the lean state at a time (t2) after a misfire determination wait period ($T_R$) longer than the enrichment wait period ($T_R$) has elapsed since the time (t0).

According to one embodiment of the present invention, when the air/fuel ratio of the exhaust gas exhausted from the cylinder that is a misfire determination subject is in the lean state, and when the lean control is not being carried out on the internal combustion engine, the enrichment processing for the air/fuel ratio is carried out. When the air/fuel ratio remains in the lean state even though the enrichment processing is carried out, it is determined that misfire occurs in the cylinder that is a misfire determination subject. Thus, it is possible to attain the misfire detection apparatus and the misfire detection method for an internal combustion engine, which are capable of correctly detecting a misfire state of an engine for a vehicle small in number of cylinders and in rotational inertia without limiting control to $O_2$ feedback control.

BRIEF DESCRIPTION OF THE DRAWINGS

FIG. 1 is a configuration diagram illustrating an entire system including a misfire detection apparatus according to a first embodiment of the present invention.

FIGS. 2A to 2E are explanatory timing charts illustrating an example of such a case that the misfire detection apparatus according to the first embodiment of the present invention determines that misfire occurs.

FIGS. 3 A to 3E are explanatory timing charts illustrating an example of such a case that the misfire detection apparatus according to the first embodiment of the present invention does not determine that misfire occurs.

FIG. 5 is a flowchart illustrating a series of operation steps of a misfire detection apparatus according to a second embodiment of the present invention.

DETAILED DESCRIPTION OF THE PREFERRED EMBODIMENTS

Figure 4:
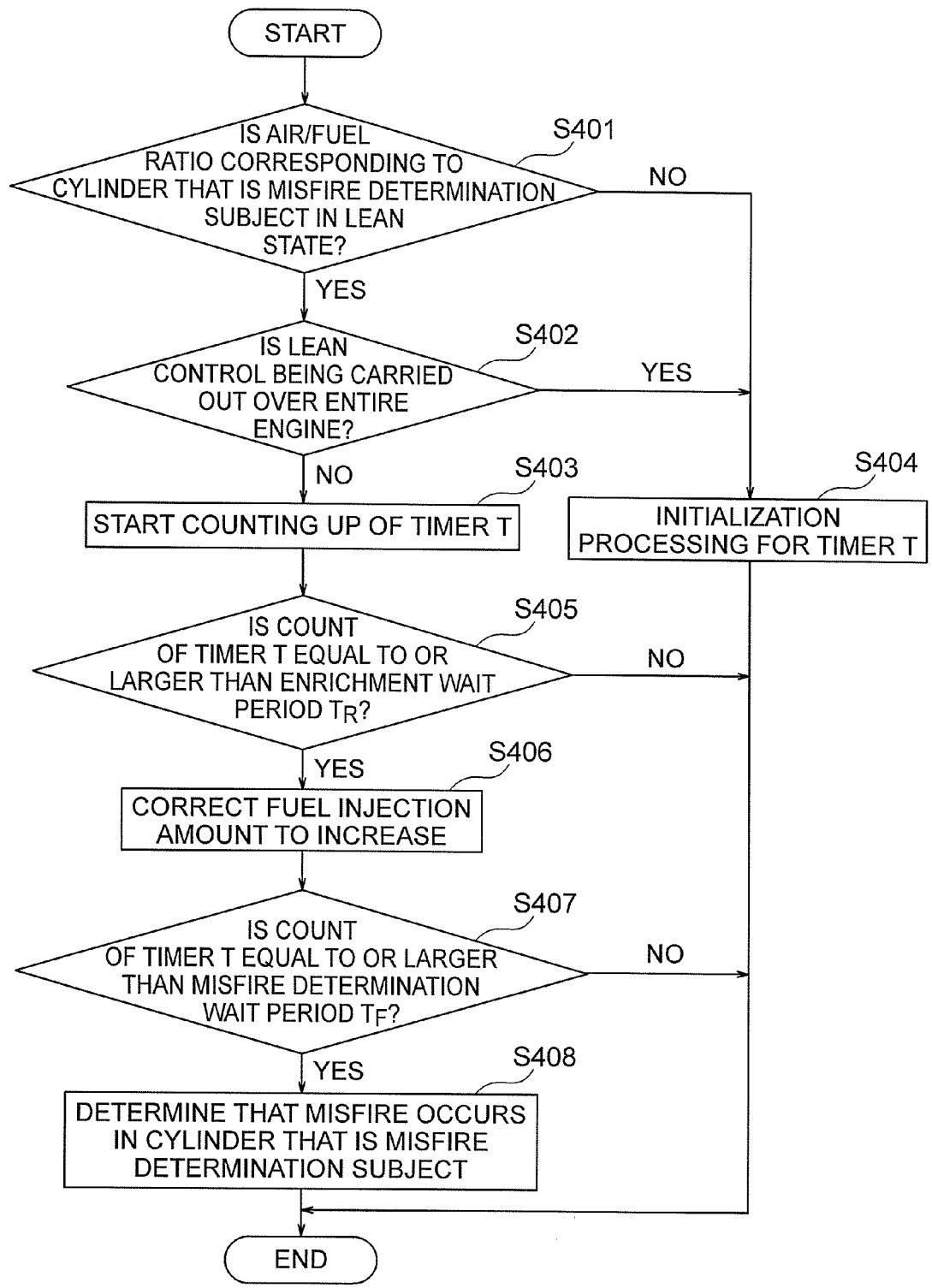
FIG. 4 is a flowchart illustrating a series of operation steps of the misfire detection apparatus according to the first embodiment of the present invention.

Referring to the drawings, a description is now given of a misfire detection apparatus and a misfire detection method for an internal combustion engine according to preferred embodiments of the present invention. Note that, for the description of the drawings, like components are denoted by like reference symbols, and redundant description is omitted. Moreover, in the following embodiments, such a case that the present invention is applied to an internal combustion engine of a two-wheeled vehicle is described as an example, but the present invention can be applied to internal combustion engines of any vehicles as well as the internal combustion engine of the two-wheeled vehicle.

First Embodiment

FIG. 1 is a configuration diagram illustrating an entire system including a misfire detection apparatus according to a first embodiment of the present invention. Note that, FIG. 1 illustrates a system configuration of a V-twin engine as an example.

In FIG. 1, an accelerator position sensor 1 detects a position of an accelerator opening degree. Moreover, an air filter 3 for purifying intake air to be supplied to the engine, and an intake air temperature sensor 4 for detecting a temperature of the intake air are installed on an air cleaner box 2 provided on an intake side of the engine.

A first cylinder 5a and a second cylinder 5b of the V-twin engine are provided on a downstream side of the air cleaner box 2. Moreover, a first intake pipe 6a and a second intake pipe 6b are respectively connected to the first cylinder 5a and the second cylinder 5b. The air in the air cleaner box 2 is supplied as intake air via the first intake pipe 6a to the first cylinder 5a, and via the second intake pipe 6b to the second cylinder 5b.

A first electronic throttle 9a including a first electronic throttle control motor 7a for controlling a throttle opening degree, and a first throttle position sensor 8a for detecting the throttle opening degree is provided on an upstream side of the first intake pipe 6a. Similarly, a second electronic throttle 9b including a second electronic throttle control motor 7b for controlling a throttle opening degree, and a second throttle position sensor 8b for detecting the throttle opening degree is provided on an upstream side of the second intake pipe 6b. Then, the respective throttle opening degrees of the first electronic throttle 9a and the second electronic throttle 9b are independently controlled, and thus amounts of the intake air can be adjusted.

A first intake air pressure sensor 10a for detecting an intake air pressure, and a first injector 11a for injecting the fuel into the first intake pipe 6a are provided on a downstream side of the first intake pipe 6a. Similarly, a second intake air pressure sensor 10b for detecting an intake air pressure, and a second injector 11b for injecting the fuel into the second intake pipe 6b are provided on a downstream side of the second intake pipe 6b. Note that, the first injector 11a may inject the fuel into the first cylinder 5a and the second injector 11b may inject the fuel into the second cylinder 5b.

A first spark plug 12a for generating a spark so as to combust a mixture (gas acquired by mixing the intake air and the fuel) in the cylinder is provided on the first cylinder 5a. Similarly, a second spark plug 12b for generating a spark so as to combust the mixture in the cylinder is provided on the second cylinder 5b.

Moreover, a water temperature sensor 13 for detecting a wall surface temperature of the engine to detect a coolant temperature of the engine is provided in the second cylinder 5b. Further, a crank angle sensor 14 for detecting a position of a crankshaft is provided on the crankshaft (not shown) of the engine. Note that, the crankshaft of the engine rotates in cooperation with pistons pushed out by the combustion of the mixture in the first cylinder 5a and the second cylinder 5b.

Moreover, a first exhaust pipe 15a and a second exhaust pipe 15b are respectively connected to the first cylinder 5a and the second cylinder 5b. The exhaust gas exhausted from the first cylinder 5a passes through the first exhaust pipe 15a, and the exhaust gas exhausted from the second cylinder 5b passes through the second exhaust pipe 15b. Then, the respective flows of the exhaust gas which have passed through the first exhaust pipe 15a and the second exhaust pipe 15b merge on the downstream side of the respective exhaust pipes, and then are purified by a catalyst 16.

Moreover, a secondary air solenoid 19 connected to a secondary air pipe 18 is provided on the air cleaner box 2. Moreover, the secondary air pipe 18 is branched and connected to the first exhaust pipe 15a and the second exhaust pipe 15b. The air in the air cleaner box 2 is supplied as secondary air via the secondary air pipe 18 and the one-way valve (not shown) to the first exhaust pipe 15a and the second exhaust pipe 15b.

On this occasion, in general, when the secondary air is supplied to the respective exhaust pipes, oxygen is supplied to the respective exhaust pipes. Thus, there is expected such an effect that the carbon monoxide density is decreased by oxygen and carbon monoxide in the exhaust gas reacting to generate carbon dioxide.

A first air/fuel ratio sensor 17a for detecting an air/fuel ratio (oxygen density) of the exhaust gas exhausted from the first cylinder 5a is provided on the upstream side of the first exhaust pipe 15a. Similarly, a second air/fuel ratio sensor 17b for detecting an air/fuel ratio (oxygen density) of the exhaust gas exhausted from the second cylinder 5b is provided on the upstream side of the second exhaust pipe 15b.

Note that, the first air/fuel ratio sensor 17a and the second air/fuel ratio sensor 17b are also referred to as $O_2$ sensor. Moreover, hereinafter, the air/fuel ratio of the exhaust gas exhausted from the first cylinder 5a is referred to as first air/fuel ratio R1, and the air/fuel ratio of the exhaust gas exhausted from the second cylinder 5b is referred to as second air/fuel ratio R2.

An electronic control unit (ECU) 100 is constructed by a memory for storing programs and maps for controlling operations of the entire engine, and a microprocessor (not shown) including a CPU.

A description is now given of respective components in the ECU 100. The ECU 100 includes a fuel injection control part 101, an ignition control part 102, a misfire detection part 103, a throttle opening degree control part 104, and a secondary air control part 105.

The fuel injection control part 101 controls the fuel injection so that the air/fuel ratios (first air/fuel ratio R1 and second air/fuel ratio R2) of the respective cylinders of the engine attain desired air/fuel ratios in accordance with a load on the engine and the like. In other words, the fuel injection control part 101 carries out air/fuel ratio control such as stoichiometric control for bringing the air/fuel ratio into a stoichiometric state (theoretical air/fuel ratio), lean control for bringing the air/fuel ratio into a lean state, and rich control for bringing the air/fuel ratio into a rich state.

As a specific example of the stoichiometric control, there is known $O_2$ feedback control for carrying out feedback control so that the air/fuel ratio is maintained to the stoichiometric state. Moreover, as a specific example of the lean control, there is known fuel cut processing control for stopping the fuel injection. Further, as a specific example of the rich control, there is known enrichment control for carrying out open loop control so that the air/fuel ratio is enriched.

Moreover, the fuel injection control part 101 controls respective operations of the first injector 11a and the second injector 11b based on detection signals from various sensors. Specifically, the fuel injection control part 101 calculates appropriate fuel injection timings and fuel injection amounts based on the detection signals from the various sensors, and outputs drive signals respectively to the first injector 11a and the second injector 11b. When the drive signals are output, the first injector 11a and the second injector 11b respectively inject the fuel.

The ignition control part 102 controls respective operations of the first spark plug 12a and the second spark plug 12b based on detection signals from various sensors. Specifically, the ignition control part 102 calculates appropriate ignition timings based on the detection signals from the various sensors, and outputs ignition signals to the ignition coils. When the ignition signals are output, the first spark plug 12a and the second spark plug 12b respectively generate sparks.

The misfire detection part 103 (misfire detection apparatus) detects the misfire state of the first cylinder 5a and the second cylinder 5b based on the detection signals from the first air/fuel ratio sensor 17a and the second air/fuel ratio sensor 17b. Moreover, the misfire detection part 103 includes an air/fuel ratio state determination part, an air/fuel ratio control determination part, an air/fuel ratio adjustment part, and a misfire determination part. Note that, an operation of the misfire detection part 103, which is a technical feature of the first embodiment, is detailed later.

The throttle opening degree control part 104 controls the respective opening degrees of the first electronic throttle 9a and the second electronic throttle 9b based on detection signals from various sensors. Moreover, the throttle opening degree control part 104 gradually decreases, over time, a limit value for the throttle opening degree corresponding to a cylinder in which the misfire detection part 103 determines that misfire occurs.

The secondary air control part 105 controls an operation of the secondary air solenoid 19 based on detection signals from various sensors. Specifically, the secondary air control part 105 outputs a drive signal to the secondary air solenoid 19 based on the detection signals from the various sensors. When the drive signal is output, the secondary air is supplied to the first exhaust pipe 15a and the second exhaust pipe 15b.

Referring to FIGS. 2A to 2E and 3A to 3E, a description is now given of an operation of the misfire detection part 103 (misfire detection apparatus) according to the first embodiment. FIGS. 2A to 2E are explanatory timing charts illustrating an example of such a case that the misfire detection apparatus according to the first embodiment of the present invention determines that misfire occurs. FIGS. 3A to 3E are explanatory timing charts illustrating an example of such a case that the misfire detection apparatus according to the first embodiment of the present invention does not determine that misfire occurs. In the timing charts in FIGS. 2A to 2E and 3A to 3E, FIGS. 2A and 3A illustrate an operation of the air/fuel ratio state determination part, FIGS. 2B and 3B illustrate an operation of the air/fuel ratio adjustment part, FIGS. 2C and 3C illustrate an operation of the misfire determination part, FIGS. 2D and 3D illustrate the detection signal of the first air/fuel ratio sensor 17a, and FIGS. 2E and 3E illustrate the detection signal of the second air/fuel ratio sensor 17b.

First, referring to FIGS. 2A to 2E, a description is given of the case where the misfire detection part 103 determines that misfire occurs. Note that, the cylinder that is a misfire determination subject is the first cylinder 5a, and the cylinder that is not a misfire determination subject is the second cylinder 5b. Moreover, when the enrichment control is being carried out over the entire engine, misfire occurs at a time t0 in the first cylinder 5a, but misfire does not occur in the second cylinder 5b, and the mixture is normally combusted by following the enrichment control.

The air/fuel ratio state determination part in the misfire detection part 103 determines whether or not the first air/fuel ratio R1 is in the lean state based on the detection signal from the first air/fuel ratio sensor 17a.

Specifically, as illustrated in FIGS. 2A to 2E, misfire has not occurred in the first cylinder 5a, and the first air/fuel ratio R1 is maintained in the rich state by following the enrichment control before the time to. Thus, the detection signal from the first air/fuel ratio sensor 17a is a rich signal (signal larger in voltage than a threshold voltage). In this case, the air/fuel ratio state determination part determines that the first air/fuel ratio R1 is not in the lean state.

Moreover, when ignition cannot be carried out in the first cylinder 5a, resulting in misfire at the time t0, the first air/fuel ratio R1 is brought into the lean state. Thus, the first air/fuel ratio sensor 17a outputs a lean signal (signal smaller in voltage than the threshold voltage). In this case, as illustrated in FIG. 2A, the air/fuel ratio state determination part determines that the first air/fuel ratio R1 is in the lean state.

The air/fuel ratio control determination part in the misfire detection part 103 determines whether or not the lean control is carried out over the entire engine based on the detection signal from the second air/fuel ratio sensor 17b.

Specifically, as illustrated in FIGS. 2A to 2E, misfire does not occur in the second cylinder 5b, and the mixture is normally combusted by following the enrichment control unlike the first cylinder 5a. Thus, the second air/fuel ratio sensor 17b continues to output the rich signal for a predetermined period. In this case, the air/fuel ratio control determination part determines that the lean control is not carried out over the entire engine.

The case where the second air/fuel ratio sensor 17b continues to output the rich signal for the predetermined period is described as a specific example of such determination by the air/fuel ratio control determination part that the lean control is not carried out over the entire engine, but the case is not limited to this case. In other words, a characteristic of the detection signal from the second air/fuel ratio sensor 17b is different between the case where the lean control is carried out over the entire engine and the case where the lean control is not carried out, and the air/fuel ratio control determination part only needs to be configured to determine whether or not the lean control is carried out over the entire engine based on the difference in the characteristic.

On this occasion, when the air/fuel ratio state determination part determines that the first air/fuel ratio R1 is in the lean state, and the air/fuel ratio control determination part determines that the lean control is not carried out over the entire engine, a lean state duration timer T for misfire determination (hereinafter simply referred to as timer T) provided in the misfire detection part 103 starts counting up.

Moreover, the air/fuel ratio adjustment part in the misfire detection part 103 attempts to bring the first air/fuel ratio R1 into the rich state when an enrichment wait period $T_R$ has elapsed after the timer T started the counting up. In other words, the enrichment processing for the first air/fuel ratio R1 is carried out as illustrated in FIG. 2B.

Specifically, the air/fuel ratio adjustment part carries out control to increase the amount of the fuel supplied to the first cylinder 5a, thereby attempting to bring the first air/fuel ratio R1 into the rich state at a time t1 after the enrichment wait period $T_R$ has elapsed since the time t0. In other words, the air/fuel ratio adjustment part carries out such correction that the fuel injection amount calculated by the fuel injection control part 101 is increased by a predetermined ratio. Then, the fuel injection control part 101 carries out such control that the fuel injection amount of the first injector 11a attains the fuel injection amount after the correction.

On this occasion, if the misfire did not occur in the first cylinder 5a, the amount of fuel supplied to the first cylinder 5a would be increased by the operation of the air/fuel ratio adjustment part, and the first air/fuel ratio R1 would be brought into the rich state. However, the misfire occurs in the first cylinder 5a, and the first air/fuel ratio R1 is not brought into the rich state, and remains in the lean state.

In other words, even though the enrichment processing for the first air/fuel ratio R1 is carried out at the time t1, the first air/fuel ratio R1 is not brought into the rich state after the time t1, and remains in the lean state. Thus, the first air/fuel ratio sensor 17a still outputs the lean signal after the time t1. In this case, the air/fuel ratio state determination part continues to determine that the first air/fuel ratio R1 is in the lean state after the time t1.

When the first air/fuel ratio sensor 17a does not output the rich signal after the timer T starts the counting up until a misfire determination wait period $T_F$, which is longer than the enrichment wait period $T_R$, elapses, the misfire determination part in the misfire detection part 103 determines that misfire occurs.

Specifically, the first air/fuel ratio R1 remains in the lean state at a time t2 after the misfire determination wait period $T_F$ has elapsed since the time to. Thus, the air/fuel ratio state determination part continues to determine that the first air/fuel ratio R1 is in the lean state during a period from the time t0 to the time t2. In this case, the misfire determination part determines that the misfire occurs in the first cylinder 5a as illustrated in FIG. 2C.

Then, referring to FIGS. 3A to 3E, a description is given of the case where the misfire detection part 103 does not determine that misfire occurs. Note that, the cylinder that is a misfire determination subject is the first cylinder 5a, and the cylinder that is not a misfire determination subject is the second cylinder 5b as in the previous case. Moreover, the $O_2$ feedback control is being carried out over the entire engine, and the mixture is being normally combusted by following the control without misfire in the first cylinder 5a and the second cylinder 5b.

On this occasion, as illustrated in FIGS. 3A to 3E, misfire does not occur in the first cylinder 5a at the time t0, but the first air/fuel ratio sensor 17a may output the lean signal due to influence of fluctuation in the combustion state generated between the cylinders or the like. In this case, as illustrated in FIG. 3A, the air/fuel ratio state determination part determines that the first air/fuel ratio R1 is in the lean state.

Moreover, as in the previous case, the air/fuel ratio control determination part determines whether or not the lean control is carried out over the entire engine based on the detection signal from the second air/fuel ratio sensor 17b.

Specifically, as illustrated in FIGS. 3A to 3E, misfire does not occur, and the mixture is normally combusted by following the $O_2$ feedback control in the second cylinder 5b similarly to the first cylinder 5a. Thus, the second air/fuel ratio sensor 17b outputs the rich signal and the lean signal repeated for a predetermined number of times at a predetermined time interval. In this case, the air/fuel ratio control determination part determines that the lean control is not carried out over the entire engine.

On this occasion, as in the previous case, the air/fuel ratio state determination part determines that the first air/fuel ratio R1 is in the lean state, and the air/fuel ratio control determination part determines that the lean control is not carried out over the entire engine. Therefore, the timer T starts the counting up. Moreover, the air/fuel ratio adjustment part attempts to bring the first air/fuel ratio R1 into the rich state when the enrichment wait period $T_R$ has elapsed since the timer T started the counting up. In other words, the enrichment processing for the first air/fuel ratio R1 is carried out as illustrated in FIG. 3B.

On this occasion, the misfire does not occur in the first cylinder 5a, and the amount of fuel supplied to the first cylinder 5a is increased by the operation of the air/fuel ratio adjustment part, with the result that the first air/fuel ratio R1 is brought into the rich state from the lean state. Thus, the first air/fuel ratio sensor 17a outputs the rich signal after the time t1. In this case, as illustrated in FIG. 3A, the air/fuel ratio state determination part determines that the first air/fuel ratio R1 is in the rich state. If the enrichment processing is carried out when misfire does not occur, the air/fuel ratio is brought into the rich state within a period after the timer T starts counting up before the misfire determination wait period $T_F$ has elapsed.

Moreover, when the air/fuel ratio state determination part determines that the first air/fuel ratio R1 is in the rich state within a period after the timer T starts counting up before the misfire determination wait period $T_F$ has elapsed, the counting up of the timer T is stopped, and the timer T is cleared (the count of the timer T is reset to 0). Then, as illustrated in FIG. 3C, when the count of the timer T does not reach the misfire determination wait period $T_F$, the misfire determination part is not activated, and thus does not determine that misfire occurs.

In this way, even if the lean signal is output from the first air/fuel ratio sensor 17a when the lean control is not carried out over the entire engine, a determination error in misfire is prevented by confirming whether the output signal remains as the lean signal or changes to the rich signal after the enrichment processing is carried out.

A description is now given of the misfire determination wait period $T_F$ and the enrichment wait period $T_R$ described above. The misfire determination wait period $T_F$ is a period for waiting after the timer T starts the counting up until the misfire determination part determines that misfire occurs, and is specifically set in advance to a period which can avoid catalyst burnout (damage on the catalyst 16) due to the misfire, and can avoid the determination error in misfire.

On this occasion, a degree of the catalyst burnout caused by the misfire differs depending on a displacement, an r.p.m., and a load state of the engine, a distance from the engine to the catalyst, and the like, and generally increases as the r.p.m. and the load of the engine increase. Therefore, as the r.p.m. and the load of the engine increase, the misfire determination wait period $T_F$ is set shorter.

A specific numerical value of the misfire determination wait period $T_F$ may be, for example, set to approximately ten to several twenty seconds for a large vehicle at an engine r.p.m. of 4,000 r/min and an accelerator opening degree of approximately 50%. Moreover, the misfire determination wait period $T_F$ may be set to 30 seconds or more in an idling state where the engine is low in r.p.m. and low in load.

In this way, the misfire determination wait period $T_F$ is set to a value in accordance with the engine r.p.m. and the engine load. Thus, a map for associating the engine r.p.m. and the engine load with the misfire determination wait period $T_F$ may be prepared in advance, and the misfire determination wait period $T_F$ corresponding to the engine r.p.m. and the engine load when the first air/fuel ratio R1 is determined to be in the lean state may be set based on the map.

Moreover, the enrichment wait period $T_R$ is a period for waiting after the timer T starts the counting up until the air/fuel ratio adjustment part starts carrying out the enrichment processing for the first air/fuel ratio R1, and is specifically set in advance to a period which can avoid the enrichment processing from being frequently carried out, and can avoid the determination error in misfire. A specific numerical value of the enrichment wait period $T_R$ may be set to, for example, a half of the misfire determination wait period $T_F$.

Referring to a flowchart in FIG. 4, a description is now given of a series of the operations of the misfire detection part 103 (misfire detection apparatus) according to the first embodiment. FIG. 4 is the flowchart illustrating the series of operation steps of the misfire detection apparatus according to the first embodiment of the present invention. On this occasion, similarly to the above, the case where the cylinder that is a misfire determination subject of the misfire detection part 103 is the first cylinder 5a is described as an example. Moreover, the operations of the flowchart in FIG. 4 are repeated at a processing cycle arbitrarily set in advance.

In Step S401, the misfire detection part 103 determines whether or not the air/fuel ratio is in the lean state based on the detection signal from the air/fuel ratio sensor corresponding to the cylinder that is a misfire determination subject. Note that, on this occasion, the misfire detection part 103 determines whether or not the first air/fuel ratio R1 is in the lean state based on the detection signal from the first air/fuel ratio sensor 17a corresponding to the first cylinder 5a.

Then, in Step S401, when the misfire detection part 103 determines that the first air/fuel ratio R1 is in the lean state (namely, YES), the misfire detection part 103 proceeds to Step S402, and when the misfire detection part 103 determines that the first air/fuel ratio R1 is not in the lean state (namely, NO), the misfire detection part 103 proceeds to Step S404.

In Step S402, the misfire detection part 103 determines whether or not the lean control is being carried out over the entire engine based on the detection signal from the air/fuel ratio sensor corresponding to the cylinder that is not a misfire determination subject. Note that, on this occasion, the misfire detection part 103 determines whether or not the lean control is being carried out over the entire engine based on the detection signal from the second air/fuel ratio sensor 17b corresponding to the second cylinder 5b.

Then, in Step S402, when the misfire detection part 103 determines that the lean control is not being carried out (namely, NO), the misfire detection part 103 proceeds to Step S403, and when the misfire detection part 103 determines that the lean control is being carried out (namely, YES), the misfire detection part 103 proceeds to Step S404.

In Step S403, the misfire detection part 103 starts the counting up of the lean state duration timer T for misfire determination, and proceeds to Step S405.

In Step S404, the misfire detection part 103 stops the counting up in order to carry out initialization processing for the timer T, clears the timer T (resets the count of the timer T to 0), finishes the series of processing steps, and proceeds to the next processing cycle.

In Step S405, the misfire detection part 103 determines whether or not the count counted up by the timer T is equal to or larger than the enrichment wait period $T_R$.

Then, in Step S405, when the misfire detection part 103 determines that the count of the timer T is equal to or larger than the enrichment wait period $T_R$ (namely, YES), the misfire detection part 103 proceeds to Step S406, and when the misfire detection part 103 determines that the count of the timer T is smaller than the enrichment wait period $T_R$ (namely, NO), the misfire detection part 103 finishes the series of processing steps, and proceeds to the next processing cycle.

In Step S406, the misfire detection part 103 carries out the enrichment processing for the air/fuel ratio corresponding to the cylinder that is a misfire determination subject. Note that, on this occasion, the misfire detection part 103 carries out the enrichment processing for the first air/fuel ratio R1, thus corrects the fuel injection amount so that the amount of the fuel supplied to the first cylinder 5*a* increases, and proceeds to Step S407. As described above, the misfire detection part 103 corrects the fuel injection amount, and the fuel injection control part 101 can thus carry out such control that the fuel injection amount of the first injector 11*a* is a fuel injection amount after the correction.

In Step S407, the misfire detection part 103 determines whether or not the count counted up by the timer T is equal to or larger than the misfire determination wait period $T_F$. Then, in Step S407, when the misfire detection part 103 determines that the count of the timer T is equal to or larger than the misfire determination wait period $T_F$ (namely, YES), the misfire detection part 103 proceeds to Step S408, and when the misfire detection part 103 determines that the count of the timer T is smaller than the misfire determination wait period $T_F$ (namely, NO), the misfire detection part 103 finishes the series of processing steps, and proceeds to the next processing cycle.

In Step S408, the misfire detection part 103 determines that misfire occurs in the cylinder (on this occasion, the first cylinder 5*a*) that is a misfire determination subject, finishes the series of processing steps, and proceeds to the next processing cycle.

On this occasion, when the misfire does not occur in the first cylinder 5*a*, the enrichment processing for the first air/fuel ratio R1 is carried out in Step S406 to change the first air/fuel ratio R1 from the lean state to the rich state. In this case, in Step S401 of the next processing cycle, the misfire detection part 103 determines that the first air/fuel ratio R1 is not in the lean state, and, in Step S404, the initialization processing for the timer T is carried out. Thus, even if the first air/fuel ratio sensor 17*a* outputs the lean signal when the lean control is not carried out over the entire engine, as long as the misfire does not occur in the first cylinder 5*a*, Step S408 is not carried out, and the misfire detection part 103 does not determine that misfire occurs.

Moreover, when the misfire occurs in the first cylinder 5*a*, even if the enrichment processing for the first air/fuel ratio R1 is carried out in Step S406, the first air/fuel ratio R1 remains in the lean state. In this case, in Step S401 of the next processing cycle, the misfire detection part 103 determines that the first air/fuel ratio R1 is in the lean state, and, in Step S404, the initialization processing for the timer T is not carried out. Thus, the timer T continues the counting up. When the count becomes equal to or larger than the misfire determination wait period $T_F$, Step S408 is carried out, and the misfire detection part 103 determines that misfire occurs.

When there is a cylinder determined to have misfire, a failure indication may be displayed for notification to a driver, which is not illustrated in the flowchart in FIG. 4. Moreover, the electronic throttle may be forced to be closed, and the fuel injection may further be stopped for the cylinder determined to have the misfire in order to prevent the burnout of the catalyst.

According to the first embodiment, when the air/fuel ratio of the exhaust gas exhausted from the cylinder that is a misfire determination subject is in the lean state, and the lean control is not carried out in the internal combustion engine, the enrichment processing for the air/fuel ratio is carried out. When the air/fuel ratio remains in the lean state even though the enrichment processing is carried out, it is determined that misfire occurs in the cylinder that is a misfire determination subject. As a result, even when this embodiment is applied to a vehicle small in number of cylinders and in rotational inertia, the misfire state of the engine can be correctly detected without limiting the control to the $O_2$ feedback control.

Moreover, the air/fuel ratio sensor is provided on the each exhaust pipe connected to the each cylinder in order to detect the air/fuel ratio of the exhaust gas of the each cylinder that is exhausted therefrom, and such a characteristic that the air/fuel ratio sensor outputs the lean signal when misfire occurs in the cylinder is used, thereby determining the misfire in the each cylinder. As a result, even for a case where the misfire determination has been difficult due to the fluctuation in rotation, according to the present invention, a determination error in misfire or oversight of the misfire is prevented.

Moreover, the air/fuel ratio sensor is provided on the each exhaust pipe connected to the each cylinder. Thus, even when shapes of the exhaust pipes are different from each other, it is not necessary to consider a timing when the burned gas and the unburned gas exhausted from the each cylinder reach the detection range of the air/fuel ratio sensor.

Moreover, the misfire determination is carried out based on the detection signal from the air/fuel ratio sensor provided on the each exhaust pipe connected to the each cylinder. Thus, the misfire determination is not limited to a case where the $O_2$ feedback control is being carried out, and can be correctly carried out even while other control (such as the enrichment control) is being carried out.

Moreover, when the lean signal is output from the air/fuel ratio sensor corresponding to the cylinder that is a misfire determination subject, and the air/fuel ratio sensor corresponding to the other cylinder outputs the signal representing such a state that the lean control is not carried out over the entire engine, the enrichment processing is carried out in order to forcibly bring the air/fuel ratio into the rich state. Therefore, even when the lean signal is continuously output from the air/fuel ratio sensor corresponding to the cylinder that is a misfire determination subject due to influence of fluctuation in the combustion state between the cylinders or the like, a determination error in misfire can be prevented, and the misfire determination can be correctly carried out.

Second Embodiment

According to the first embodiment, a description is given of such a case that, as the enrichment processing for the air/fuel ratio, the correction is carried out so as to increase the amount of the fuel supplied to the cylinder that is a misfire determination subject. In contrast, according to a second embodiment of the present invention, a description is given of such a case that, as the enrichment processing for the air/fuel ratio, the supply of the secondary air to the exhaust pipe connected to the cylinder that is a misfire determination subject is stopped. In the following section, a description is mainly given of a point different from the first embodiment, and a description of the same point is omitted.

FIG. 5 is a flowchart illustrating a series of operation steps of a misfire detection apparatus according to the second embodiment of the present invention. Note that, the flowchart in FIG. 5 is acquired by adding Step S406A to the flowchart in FIG. 4 in place of Step S406.

In other words, in Step S406A in FIG. 5, the misfire detection part 103 carries out such control that the secondary air control part 105 stops the supply of the secondary air as the enrichment processing for the first air/fuel ratio R1.

On this occasion, when the secondary air is always supplied, the ratio of the air increases in the air/fuel ratio of the exhaust gas detected by the air/fuel ratio sensor. Thus, even if the air/fuel ratio of the exhaust gas is in the rich state when misfire does not occur in the cylinder, as long as the secondary air is supplied, the air/fuel ratio of the exhaust gas is brought into the lean state. In this case, the air/fuel ratio sensor outputs the lean signal.

Then, in Step S406A, the misfire detection part 103 stops the supply of the secondary air in place of the correction of the fuel injection amount as the enrichment processing for the first air/fuel ratio R1. In this case, when misfire does not occur in the first cylinder 5a, the first air/fuel ratio before the supply of the secondary air is in the rich state, and the stop of the supply of the secondary air results in the rich state of the first air/fuel ratio R1. In contrast, when misfire occurs in the first cylinder 5a, the first air/fuel ratio before the supply of the secondary air is in the lean state, and even when the supply of the secondary air is stopped, the first air/fuel ratio R1 remains in the lean state.

In this way, when the secondary air is always supplied, in place of such correction as increasing the amount of the fuel supplied to the cylinder that is a misfire determination subject, the supply of the secondary air to the exhaust pipe may be stopped. As a result, when the misfire does not occur in the cylinder that is a misfire determination subject, the air/fuel ratio can be changed from the lean state to the rich state.

According to the second embodiment, as the enrichment processing for the air/fuel ratio, the supply of the secondary air is stopped. As a result, the fuel injection amount does not need to be increased so that the combustion in the engine itself is not changed, and the driver does not sense the change in combustion, which is favorable for the drivability.

In the first and second embodiments, there have been described, as examples, such cases that the misfire detection part 103 increases the fuel injection amount or stops the supply of the secondary air as the enrichment processing for the air/fuel ratio, but both of the operations may be carried out.

What is claimed is:

1. A misfire detection apparatus for an internal combustion engine, which is configured to detect misfire in the internal combustion engine including a plurality of cylinders each connected to an exhaust pipe for exhausting an exhaust gas, and each including, on the exhaust pipe, an air/fuel ratio sensor for detecting an air/fuel ratio of the exhaust gas, the misfire detection apparatus being configured to carry out air/fuel ratio control for controlling the air/fuel ratio of the exhaust gas exhausted from each of the plurality of cylinders, the misfire detection apparatus comprising:
an air/fuel ratio state determination part for determining, based on a detection signal from a first air/fuel ratio sensor corresponding to a first cylinder that is a misfire determination subject among the plurality of cylinders, whether or not a first air/fuel ratio of the exhaust gas exhausted from the first cylinder is in a lean state;
an air/fuel ratio control determination part for determining, based on a detection signal from a second air/fuel ratio sensor corresponding to a second cylinder that is a remaining cylinder different from the first cylinder among the plurality of cylinders, whether or not lean control is being carried out as the air/fuel ratio control carried out on the internal combustion engine;
an air/fuel ratio adjustment part for carrying out enrichment processing for the first air/fuel ratio at a time (t1) after an enrichment wait period ($T_R$) has elapsed since a time (t0) when the air/fuel ratio state determination part determines that the first air/fuel ratio is in the lean state and the air/fuel ratio control determination part determines that the lean control is not being carried out on the internal combustion engine; and
a misfire determination part for determining that misfire occurs in the first cylinder when the air/fuel ratio adjustment part has carried out the enrichment processing at the time (t1), and when the air/fuel ratio state determination part determines that the first air/fuel ratio is still in the lean state at a time (t2) after a misfire determination wait period ($T_F$) longer than the enrichment wait period ($T_R$) has elapsed since the time (t0).

2. A misfire detection apparatus for an internal combustion engine according to claim 1, wherein the air/fuel ratio adjustment part carries out, as the enrichment processing, control of increasing, through the air/fuel ratio control, an amount of a fuel to be supplied to the first cylinder.

3. A misfire detection apparatus for an internal combustion engine according to claim 1, wherein the air/fuel ratio adjustment part carries out, when a secondary air is supplied to the exhaust pipe connected to the first cylinder and the first air/fuel ratio of the exhaust gas after the supply of the secondary air is detected by the first air/fuel ratio sensor, as the enrichment processing, control of stopping the supply of the secondary air.

4. A misfire detection apparatus for an internal combustion engine according to claim 1, wherein the air/fuel ratio control determination part determines that the lean control is not being carried out on the internal combustion engine in one of a case where the second air/fuel ratio sensor continues to output a rich signal for a predetermined period, and a case where the second air/fuel ratio sensor outputs the rich signal and a lean signal repeated for a predetermined number of times at a predetermined time interval.

5. A misfire detection apparatus for an internal combustion engine according to claim 2, wherein the air/fuel ratio control determination part determines that the lean control is not being carried out on the internal combustion engine in one of a case where the second air/fuel ratio sensor continues to output a rich signal for a predetermined period, and a case where the second air/fuel ratio sensor outputs the rich signal and a lean signal repeated for a predetermined number of times at a predetermined time interval.

6. A misfire detection apparatus for an internal combustion engine according to claim 3, wherein the air/fuel ratio control determination part determines that the lean control is not being carried out on the internal combustion engine in one of a case where the second air/fuel ratio sensor continues to output a rich signal for a predetermined period, and a case where the second air/fuel ratio sensor outputs the rich signal and a lean signal repeated for a predetermined number of times at a predetermined time interval.

7. A misfire detection method for an internal combustion engine, which involves detecting misfire in the internal combustion engine including a plurality of cylinders each connected to an exhaust pipe for exhausting an exhaust gas, and each including, on the exhaust pipe, an air/fuel ratio sensor for detecting an air/fuel ratio of the exhaust gas, the misfire detection method involving carrying out air/fuel ratio control for controlling the air/fuel ratio of the exhaust gas exhausted from each of the plurality of cylinders, the misfire detection method comprising:
determining, based on a detection signal from a first air/fuel ratio sensor corresponding to a first cylinder that is a misfire determination subject among the plurality of cylinders, whether or not a first air/fuel ratio of the exhaust gas exhausted from the first cylinder is in a lean state;

determining, based on a detection signal from a second air/fuel ratio sensor corresponding to a second cylinder that is a remaining cylinder different from the first cylinder among the plurality of cylinders, whether or not lean control is being carried out as the air/fuel ratio control carried out on the internal combustion engine;

carrying out enrichment processing for the first air/fuel ratio at a time (t1) after an enrichment wait period ($T_R$) has elapsed since a time (t0) when it is determined that the first air/fuel ratio is in the lean state and that the lean control is not being carried out on the internal combustion engine; and determining that misfire occurs in the first cylinder when the enrichment processing has been carried out at the time (t1), and when it is determined that the first air/fuel ratio is still in the lean state at a time (t2) after a misfire determination wait period ($T_F$) longer than the enrichment wait period ($T_R$) has elapsed since the time (t0).

* * * * *